United States Patent [19]
Tinsler

[11] Patent Number: 5,511,387
[45] Date of Patent: Apr. 30, 1996

[54] REFRIGERANT RECOVERY SYSTEM

[75] Inventor: Theodore E. Tinsler, Sidney, Ohio

[73] Assignee: Copeland Corporation, Sidney, Ohio

[21] Appl. No.: 373,466

[22] Filed: Jan. 17, 1995

Related U.S. Application Data

[63] Continuation of Ser. No. 56,717, May 3, 1993, abandoned.

[51] Int. Cl.$^6$ ............................................ F25B 45/00
[52] U.S. Cl. .................................... 62/292; 62/149
[58] Field of Search ............................. 62/79, 149, 292

[56] References Cited

U.S. PATENT DOCUMENTS

| | | | |
|---|---|---|---|
| 2,246,875 | 6/1941 | Carney | 62/1 |
| 4,249,387 | 2/1981 | Crowley | 62/54 |
| 4,476,688 | 10/1984 | Goddard | 62/292 |
| 4,539,817 | 9/1985 | Staggs et al. | 62/292 |
| 4,766,733 | 8/1988 | Scuderi | 62/292 |
| 4,776,174 | 10/1988 | Rich et al. | 62/292 |
| 4,805,416 | 2/1989 | Manz et al. | 62/292 |
| 4,809,515 | 3/1989 | Houwink | 62/292 |
| 4,903,499 | 2/1990 | Merritt | 62/292 |
| 4,981,020 | 1/1991 | Scuderi | 62/292 |
| 4,998,413 | 3/1991 | Sato et al. | 62/149 |
| 5,077,984 | 1/1992 | Vance | 62/292 |
| 5,123,259 | 6/1992 | Morgan, Sr. | 62/292 |
| 5,127,232 | 7/1992 | Paige et al. | 62/292 |
| 5,189,881 | 3/1993 | Miles | 62/292 |
| 5,201,188 | 4/1993 | Sakuma | 62/292 |
| 5,233,840 | 8/1993 | Scaringe | 62/292 |

FOREIGN PATENT DOCUMENTS

WO8100756  3/1981  WIPO.

Primary Examiner—John M. Sollecito
Attorney, Agent, or Firm—Harness, Dickey & Pierce

[57] ABSTRACT

Two preferred embodiments of an improved refrigerant recovery system and method for recovering refrigerant from a separate system are disclosed whereby the first embodiment utilizes a closed-loop refrigeration system employing a portable storage tank to recover refrigerant from a separate system that needs to be serviced. The first embodiment recovers refrigerant from the separate system by placing a storage tank within an evaporator that is cooled by evaporator coils and evacuated by a vacuum pump. The vacuum pump is valved off and recovered refrigerant is directed to the storage tank from the separate system. None of the recovered refrigerant contacts the compressor of the recovery system and vacuum pump. An alternative to the first embodiment provides a booster pump in-line with the storage tank and the separate system for transferring any residual refrigerants into the storage tank. The second preferred embodiment includes a portable storage tank located within an insulation device This system employs two phases whereby during phase 1 primarily liquid refrigerant is directed to the storage tank. Once all of the liquid has been recovered and a predetermined pressure is reached in the storage tank, phase 2 is activated whereby primarily recovered gas is directed through the compressor and eventually dumped into the cooled storage tank. An alternative to this second embodiment provides a fluid sensor which automatically activates phase 2 when all of the liquid refrigerant has been recovered from the separate system and when the storage tank is at a predetermined pressure.

13 Claims, 3 Drawing Sheets

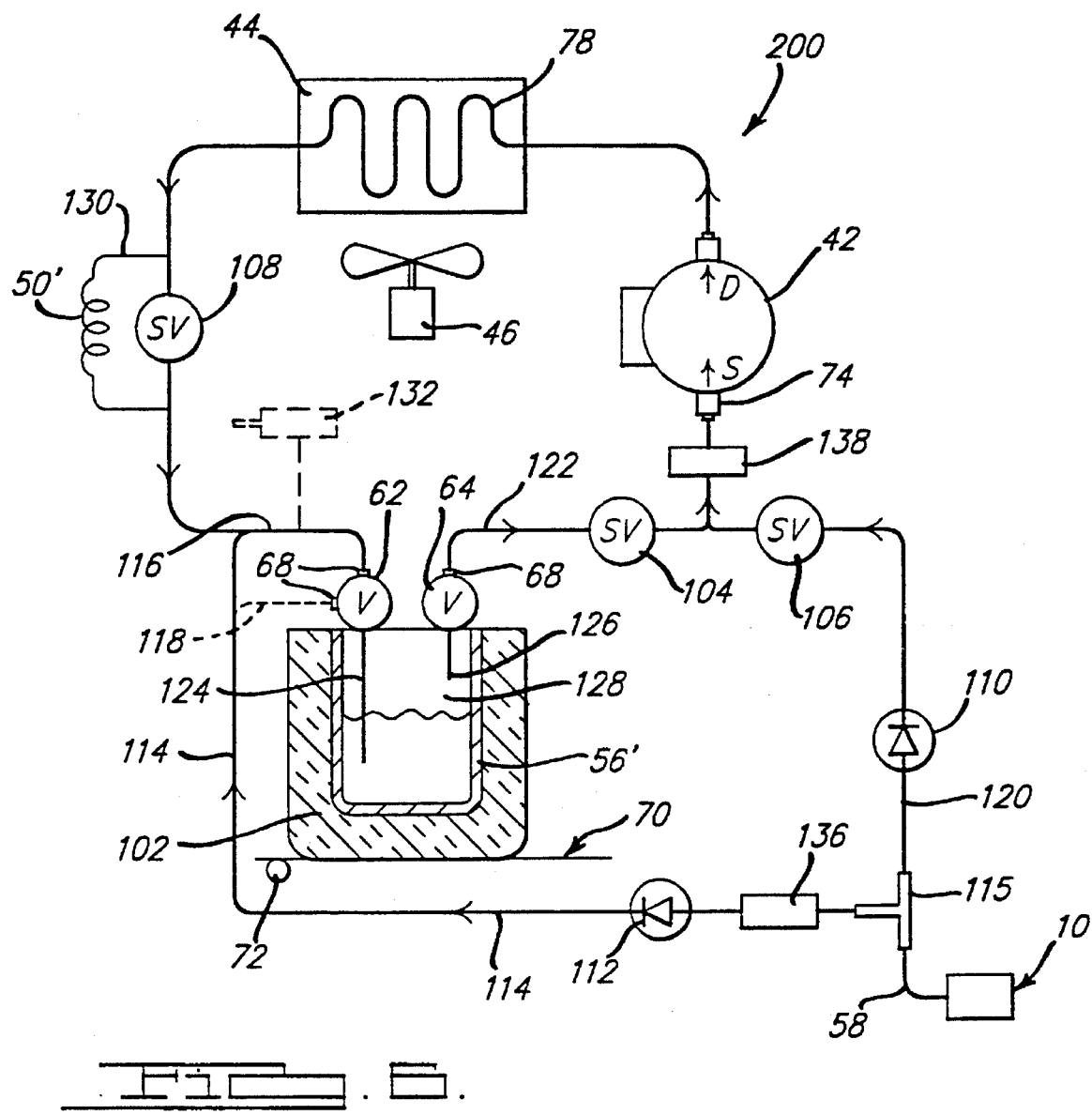

REFRIGERANT RECOVERY SYSTEM

This is a continuation of U.S. patent application Ser. No. 08/056,717, filed May 3, 1993, now abandoned.

FIELD OF THE INVENTION

The present invention relates generally to a method and apparatus for servicing a refrigeration system, more specifically, an improved refrigerant recovery system and method for recovering refrigerant from the refrigeration system being serviced.

BACKGROUND OF THE INVENTION

Refrigeration systems are widely used in commercial and domestic applications for a wide variety of purposes. Some of the most well known domestic applications of refrigeration systems include home air conditioners, refrigerators, food freezers, and automotive air conditioners. In commercial applications, refrigeration systems are commonly used for cooling various systems during manufacturing processes, for example, large walk-in coolers and the cooling of machinery that generates heat during the manufacturing process. The operation of these refrigeration systems is well known, and generally, refrigerants such as R-12, R-22, R-500 and R-502, are used as the cooling medium for the refrigeration process.

On occasion these refrigeration systems may require servicing due to the rigorous operating conditions the systems are subjected to. Most refrigeration systems, if not properly maintained, will become overly contaminated with acids, moisture, air, and/or liquid sludge. These contaminants are extremely harmful to the primary components of the refrigeration system, and, especially, the compressor may have its life drastically shortened. Also, when a refrigeration system operates with contaminated refrigerant, the efficiency of the system is jeopardized and, therefore, the cooling capacity of the system is less than optimal.

In the past, service technicians have not paid close attention to the release of refrigerants, for example, chloralfluorocarbons (CFC) and hydrochloralfluorocarbons (HCFC), into the atmosphere when servicing refrigeration systems. However, in 1992 the United States Congress mandated new provisions under the Federal Clean Air Act which made it illegal for anyone to vent CFCs and HCFCs into the atmosphere. Furthermore, new EPA Regulations require heating, ventilation and air conditioning technicians to begin to recover refrigerants when servicing refrigeration systems. Also, further EPA regulations require a minimum vacuum of ten inches of Mercury to be obtained in the field unit being recovered to assure that the field unit is sufficiently evacuated. There are at least two types of refrigerant recovery systems that have been used by service technicians when they are servicing a refrigeration system. In general, these systems are expensive because of their complicated design, they employ a multitude of components, they are inefficient in their recovery of refrigerants, they are limited as to the type of gases they can recover, they have an inherent tendency to contaminate the recovery compressor and therefore shorten the life of the compressor, and are not well suited for usage in the field by a service technician because of their size limitations.

The first type of refrigerant recovery system generally employed to recover refrigerant from a refrigeration system uses a positive displacement compressor that is vulnerable to damage because it directly pumps contaminated refrigerant, air, moisture and/or liquid sludge through the compressor to a storage device, nearly all, if not all, of the time during the refrigerant recovery process. Because these compressors continuously place the principal fluid in direct communication with the compressor's oil sump, valves, cylinders, etc., oil level and oil quality become difficult to maintain. As a result, the compressor may become corroded from the acids, air, moisture and other contaminants within the system. This obviously may lead to a shortened compressor life, for example, less than a year, and, also, adversely affect the performance of the refrigerant recovery system.

The second type of refrigerant recovery system utilizes a closed refrigeration system such as that described in U.S. Pat. No. 4,539,817. In this type of refrigerant recovery system, a closed refrigeration system is provided separate from the field unit being serviced. The field unit could be, for example, a walk in freezer that could be used in a restaurant or an air conditioner unit that could be found in a residential home. The closed refrigeration system includes a condenser, compressor, a series of filters and valves, and a storage container having heat exchange coils located therein. The heat exchange coils located within the container are cooled to create a low pressure atmosphere within the container which is directly connected to the fluid refrigeration system to be serviced. This pressure differential between the field unit and the storage container allows refrigerant to be naturally drawn into the container. The container is capable of being disconnected from the closed refrigeration system through the use of a series of couplings. A new container can be hooked up to the closed refrigeration system and the cycle can be repeated. Because the closed refrigerant recovery system utilizes a storage container that employs evaporator coils located therein, the cost of each container becomes very expensive. Also, the coils increase the weight of the container and therefore decrease its mobility. Furthermore, because this system operates solely on the premise of a pressure differential created by the cooling effect of the heat exchange coils, the volume of recovered refrigerant is less than optimal because the system is incapable of reaching sufficiently low pressures within the container. The result is that a measurable quantity of refrigerant is stranded in the field unit when it is serviced. This quantity of refrigerant is sometimes dispersed into the atmosphere when the unit is being serviced, and therefore, it is not recovered and thus not recycled. And finally, because the container uses a series of couplings for interconnecting the storage containers, the opportunity for releasing refrigerant into the atmosphere is increased.

In light of the above-mentioned problems, it would be desirable to have a refrigerant recovery system that is portable, utilizes a refrigeration design that minimizes the components that are subjected to contaminated refrigerant, air and moisture, while being capable of removing 100% or nearly 100% of the refrigerant from the field unit being serviced. Such a system should minimize, if not entirely eliminate, the quantity of refrigerant dispersed into the atmosphere for environmental concerns and so that the maximum amount of refrigerant can be recycled. Also, such systems should be capable of creating sufficiently low vacuum pressures in the field unit in order to enhance the fluid recovery rate and recoverable fluid volume. Furthermore, it would be desirable if the recovery system could be universal so that various fluids could be recovered by a single recovery system. It would also be desirable to provide a refrigerant recovery system that is inexpensive, portable and lightweight in order to accommodate the needs of the field service technician.

SUMMARY OF THE INVENTION

Accordingly, it is an object of the present invention to provide a refrigerant recovery system that overcomes the problems mentioned above. Such a refrigerant recovery system should protect the compressor of the refrigerant recovery system when transferring contaminated refrigerant from the field unit.

A first preferred form of the invention provides as one of its aspects, a novel closed refrigerant recovery system for recovering refrigerant from a field unit. The closed refrigerant recovery system comprises a storage structure capable of being evacuated and receiving refrigerant that is recovered from the field unit. A unique evaporator is provided that has coils surrounding the storage structure and said evaporator is operable to receive the storage structure and maintain the storage structure at a predetermined temperature while contaminated refrigerant is recovered from the field unit. The closed refrigerant recovery system further comprises a condensing device for condensing the refrigerant located in the closed refrigerant recovery system, a vacuum pump connected to the storage structure for reducing the pressure within the storage structure, at least one flow control structure operable to control the flow of contaminated refrigerant into the storage structure, and a recovery compressor for compressing the refrigerant located within the closed loops of the recovery system, whereby the closed refrigerant recovery system is operable to contain the recovered contaminated refrigerant from the recovery compressor and the vacuum pump. The refrigerant recovery system further includes an optional transportation structure that is capable of transporting the refrigerant recovery system in the field.

The first preferred form of the present invention provides as another of its aspects, a process for recovering refrigerant from a separate refrigeration system, for example a field unit such as an air conditioner. The process comprises locating a removable refrigerant storage tank within the evaporator of the refrigeration recovery system, cooling the storage tank to below a predetermined temperature, and evacuating the storage tank to a predetermined low pressure to create a pressure differential between the field unit and the storage tank. The process further comprises opening valves and introducing contaminated refrigerant from the field unit to the storage tank while maintaining the temperature within the storage tank at a predetermined level until nearly all of the refrigerant is recovered.

Because of this novel design, none of the contaminated fluids recovered by the recovery system are ever placed in contact with the recovering compressor and, therefore, the life of the compressor is substantially increased. Furthermore, by providing a novel removable and reusable refrigerant storage tank capable of being stored and cooled by the unique evaporator, various types of fluids can be collected by the closed refrigerant recovery system. Also, because the novel refrigerant recovery system utilizes few connections between the field unit and the recovery system itself, very little, if any, refrigerant is lost to the atmosphere during the reclaiming process. Moreover, by creating a significant temperature and pressure differential between the storage tank and the field unit, nearly all of the contaminated refrigerant can be reclaimed. Also, there is increased storage per tank because the process condenses refrigerant in the tank via cooling. And finally, a booster pump may be provided in-line between the storage tank and the field unit in order to remove any residual refrigerant remaining in the field unit by evacuating to a lower pressure.

A second preferred form of the present invention provides as one of its aspects, a novel refrigerant recovery system for recovering refrigerant from a field unit. This refrigerant recovery system comprises a compressor, a condenser, an expansion device, solenoid valves, check valves and a portable refrigerant recovery tank that is insertable within a thermal insulation device.

The second preferred form of the present invention provides as another of its aspects, a process for recovering refrigerant from a separate refrigeration system. The process comprises the utilization of two phases, of which, the first phase includes the steps of connecting the field unit being recovered to a recovery tank, locating the removable recovery tank within a thermal insulation device and operating the cooling cycle of the recovery unit such that the removable recovery tank becomes cooled thereby causing the pressure within the recovery tank to decrease and the refrigerant in the field unit to flow into the recovery tank. When the pressure within the recovery tank is below a predetermined value and substantially all of the liquid refrigerant has been recovered, the second phase is activated thus allowing recovered refrigerant to be routed directly through the compressor and into the cooled low pressure storage tank. The operation of the second phase allows substantially all of the refrigerant in the field unit to be evacuated in a relatively short period of time because vacuums less than 20 inches mercury are reached within the field unit. And for increased performance, the system can be operated to modulate between phases one and two in order to keep the recovery tank at a low pressure and temperature. An alternative to this second preferred form provides a unique sensor operable to sense when no liquid refrigerant is being recovered during phase 1. From the following specification taken in conjunction with the accompanying drawings and appended claims, other objects, features and advantages of the present invention will become apparent to those skilled in the art.

BRIEF DESCRIPTION OF THE DRAWINGS

FIG. 6 is an alternative to the FIG. 5 embodiment where a fluid sensor is employed in the recovery system.

DETAILED DESCRIPTION OF THE PREFERRED EMBODIMENT

The refrigerant recovery system is designed to protect the compressor of the recovery system from being contaminated by recovered refrigerant (or other fluids) including any potentially damaging contaminants carried thereby including other liquids, gases, etc. (hereinafter fluids), as well as being designed to maximize the fluid recovery rate and the quantity of refrigerant recoverable from the field unit. However, it is to be understood that the following detailed description of the preferred and alternative embodiments are merely exemplary in nature and is in no way intended to limit the invention, its application or uses.

Figure 1:
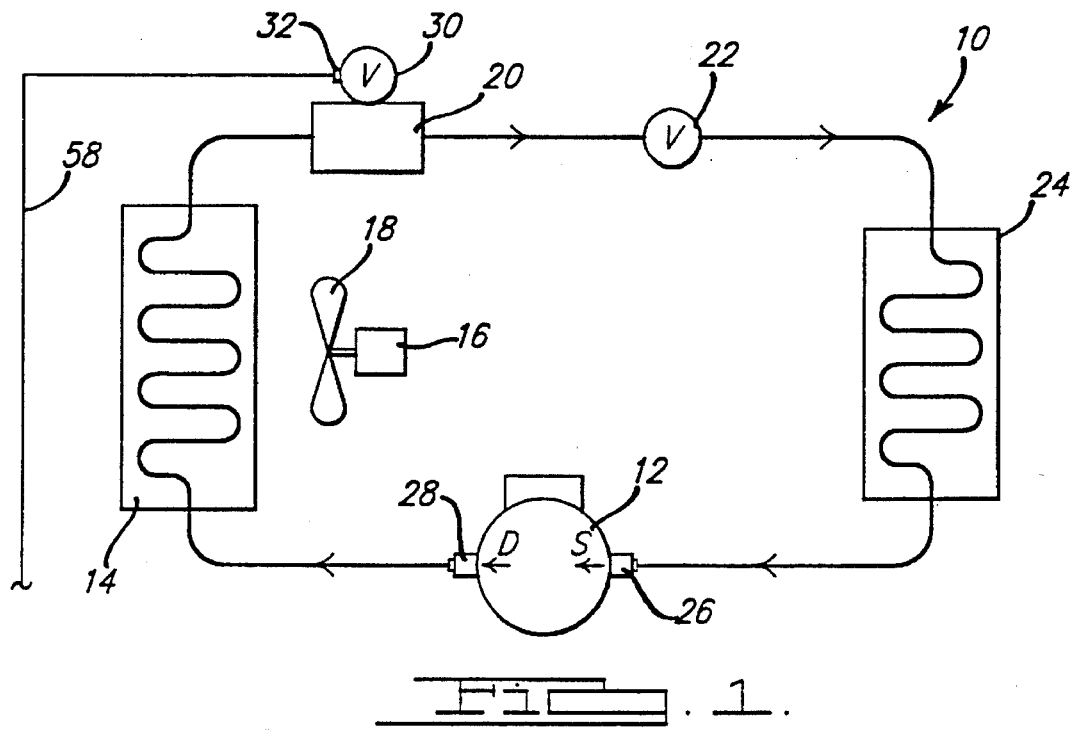
FIG. 1 is a schematic diagram of a typical air conditioning system that can be serviced by the present invention.

With particular reference to FIG. 1, the basic components of a standard refrigeration or air conditioning system that uses refrigerant for a cooling means is illustrated. This air conditioning system, hereinafter referred to as a field unit 10, includes a standard compressor 12 which compresses the refrigerant gas and delivers the gas to a condenser 14 where the gas is subsequently converted to a liquid state. A motor 16 may be provided to propel a fan 18 for cooling the condenser 14 to enhance reliquification of the refrigerant or, alternatively, some other heat exchange means may be utilized for this purpose. The liquid refrigerant flows from the condenser 14 to a refrigerant containing unit 20 that acts as a small reservoir for storing and containing the liquid refrigerant during the operation of the field unit. The storage containing unit 20 can also include a display member (not shown) such as a sight glass to allow the operator to view the refrigerant. From the storage containing unit 20 the liquid refrigerant is delivered to an evaporator 24 via an expansion valve 22 where the refrigerant is evaporated to a gaseous state to enable the system to provide cooling. Once the refrigerant has been returned to a gaseous state, refrigerant then flows to the suction inlet port 26 of the compressor 12 where the refrigerant is compressed and discharged through discharge port 28 and then delivered to the condenser 14. This cycle is repeated until the field unit supplies the desired amount of cooling. The field unit 10 also has a standard on-off control valve 30 which communicates with the refrigerant containing unit 20. Valve 30 is maintained in a closed position during operation of the field unit 10 and is primarily used when a service technician wishes to drain the refrigerant from the field unit 10. A conventional connector coupling 32 is provided and allows conduit 58 of the recovery system 40 to be easily disconnected from the field unit 10.

Figure 2:
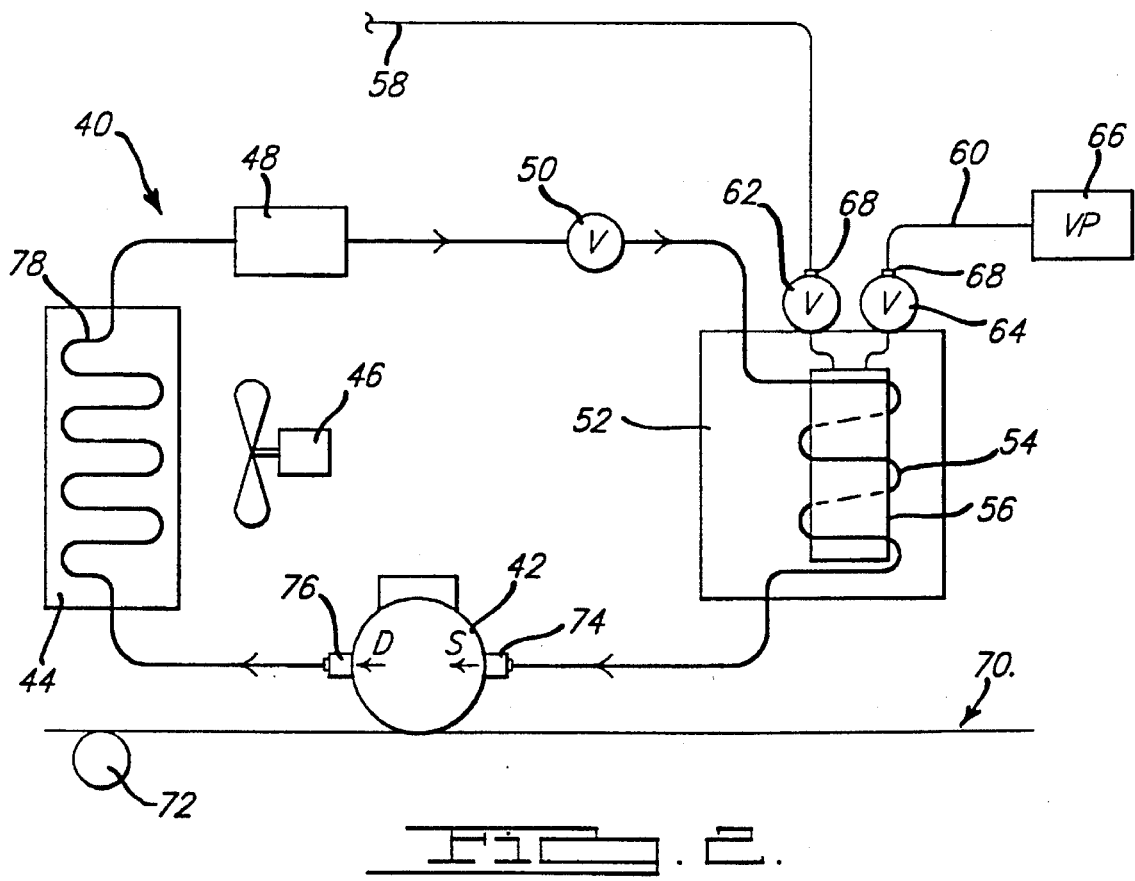
FIG. 2 is a schematic diagram of the closed-loop refrigerant recovery system of the present preferred invention showing the primary components of the system.

The first preferred form of the novel refrigerant recovery system 40 is illustrated in FIG. 2. The primary components of the refrigerant recovery system 40 includes a conventional compressor 42 connected via a conduit to a standard condenser 44 that is cooled by a fan unit 46. The condenser 44 is connected via a conduit to an optional fluid storage tank 48 that supplies fluid to a conventional expansion device 50. The expansion device 50 provides expanded liquid to a unique evaporator housing 52 whereby evaporator coils 54 are wrapped around a unique portable refrigerant storage tank 56. Fluid conduit lines 58 and 60 are releasably connected to the portable refrigerant storage tank 56 and have control valves 62 and 64 in-line with said conduits. The control valves 62 and 64 may either be manually controlled or of the solenoid-type actuated valves. A conventional vacuum pump 66 is provided on one end of conduit 60 and is releasably connected to valve 64 by a quick disconnect means 68. Likewise, conduit 58 is connected to control valve 62 by a connector means 68. An optional transporting structure 70 is illustrated and may include wheels 72 that allow the above-mentioned components of the refrigerant recovery system 40 to be easily transported in the field by a service technician. The refrigerant recovery system 40 can therefore be portable and is intended to be lightweight. The present recovery system weighs approximately 50 pounds. It will be appreciated by those skilled in the art that assembly of the refrigerant recovery system to the transport structure 70 is conventional in nature and needs no further discussion.

The refrigeration storage tank 56 is a pressure vessel capable of being subjected to pressure conditions normally found in refrigeration systems. Furthermore, the refrigerant storage tank 56 is portable, easily replaceable and insertable within the evaporator housing 52 and therefore, can be replaced when it is full of contaminated refrigerant, or other fluids, with another storage tank or the like, and is preferred to have a fifty pound capacity. Because the storage tank 56 is interchangeable, the refrigeration recovery system 40 can be used to recover fluids other than those refrigerants that are generally found in refrigeration systems. The evaporator housing 52 is unique in design and includes evaporator coils 54 which preferably substantially surrounds the storage tank 56 to enhance the cooling rate of the storage tank 56. By surrounding the storage tank 56 with coils 54, the tank 56 can be cooled at a much faster rate which increases the fluid recovery rate and thus cuts down on the time a service technician is on the job. The expansion device 50 is a standard expansion valve and delivers a predetermined quantity of cooled liquid refrigerant to coils 54 whereby the refrigerant gas absorbs heat from the storage tank 56 and the heated refrigerant is vaporized by the time it exits the evaporator housing 52. The refrigeration recovery system 40 has sufficient cooling capacity to cool the refrigeration storage tank 56 and maintain a temperature at or below zero degrees Fahrenheit (preferably Zero to −60 degrees Fahrenheit) during the entire time period fluids are evacuated from the field unit 10. As a consequence, a vacuum in the pressure range of 10 inches of Mercury is obtainable within the storage tank 56. At a storage tank inside temperature of zero degrees Fahrenheit or lower, the tank saturated pressure is at or below the normal suction pressure on a conventional open recovery system. These low temperatures are required during the recovery process in order to lower the saturated pressure within the storage tank 56 to below atmospheric pressure.

It will be appreciated that the evaporator housing 52 could further include a hinged door (not shown) that may allow the storage tank 56 to be substantially enclosed within the evaporator housing 52. If such an embodiment is employed, a suitable access for operating valves 62 and 64 should be provided. The evaporator housing 52 may further include and/or act as an insulator for storage tank 56 to help maintain storage tank 56 at a predetermined temperature during the recovery process. It will further be appreciated that any conventional quick release couplings could be employed to easily disconnect the storage tank 56 from any hoses or conduits connected to it.

The vacuum pump 66 is a standard vacuum pump and removes the air within the storage tank 56 so that the migration process of refrigerant into the storage tank 56 is greatly enhanced. The vacuum pump 66 is removably coupled, via a conduit 60, to flow control valve 64 which is preferably provided on the storage tank 56. Usage of the pump 66 is normally only required when a fresh or new storage tank 56 is used where the tank 56 is often empty of fluids and thus, is full of air that needs to be evacuated.

The compressor 42 is a hermetically sealed compressor of conventional design and may be of the rotary, scroll, or piston type compressor. The compressor 42 has a suction port 74 and discharge port 76 and is capable of providing a sufficient quantity of compressed refrigerant to allow the storage tank 56 to be cooled during the reclaiming process.

The condenser 44 is a standard air cooled condenser having heat exchange coils 78 routed therein which are cooled by the air circulated by circulating fan 46. The condenser 44 has a sufficient cooling capacity to cool the compressed gas that enters the condenser 44 and thereby converting the compressed gas into a liquid state before exiting the condenser 44. Water-cooled type condenser units may be employed, however, such units tend to increase the weight of the condenser and, therefore, make the refrigerant recovery system less portable.

A discussion of the operation of the first preferred embodiment as disclosed in FIG. 2 will now follow. For example purposes only, a discussion of removing refrigerant from an air conditioner is presented.

When a field unit 10 requires servicing that necessitates that the contaminated refrigerant be removed from the field unit 10, the service technician must carefully remove the contaminated refrigerant from the field unit 10 without dispersing any refrigerant into the atmosphere. To accomplish this task, the field technician must properly install a portable storage tank 56 within the evaporator housing 52 of the refrigerant recovery system 40 and connect vacuum pump 66 to valve 64. Next, the service technician must locate the refrigerant recovery system 40 in close proximity to the field unit 10 so that the conduit 58 may be connected by couplings 32 and 68. Once this is done, the field unit 10 is turned off, valves 30, 62 and 64 are placed in a closed position, and the compressor 42 of the refrigerant recovery system 40 is then activated to begin the cooling cycle which chills the storage tank 56. Once the storage tank 56 has been cooled to a desired inside temperature, for example Zero degrees to −60 degrees Fahrenheit, valves 62 and 64 are then opened and vacuum pump 66 is activated. Note, however, that the vacuum pump 66 need only be used when non-condensibles (gases) are in the tank 56. This primarily occurs when a new storage tank 56 is used. The compressor 42 may continue to run or be deactivated during the evacuation step; the key here is to maintain the desired temperature within the storage tank 56. Also, throughout the recovery process, the compressor 42 may be activated and deactivated at various times to assure proper cooling of the storage tank 56. The vacuum pump 66 is operated for a sufficient period of time to reduce the pressure within storage tank 56 and conduit 58 to a low pressure normally encountered in refrigeration equipment. It is preferred that the pressure be reduced to 200 microns of Mercury or lower to remove as much non-condensible gas as possible in the tank 56 in order to enhance the fluid recovery rate. Once the predetermined pressure level is attained, the vacuum pump 66 is shut off and valve 64 is closed. As long as valve 64 remains closed, no contaminated refrigerant will contact the vacuum pump 66 and, therefore, the integrity of the pump 66 will be maintained. It will be appreciated that the compressor 42 and vacuum pump 66 may be turned on in any order so that the desired effect is obtained. The key here is to assure that tank 56 becomes evacuated prior to starting the fluid recovery process and that the compressor 42 and the vacuum pump 66 will not be contaminated with recovered fluids.

At this point, recovery of the contaminated refrigerant from the field unit 10 can begin by opening valves 30 and 62. Once valve 30 is opened, the contaminated refrigerant (both liquids and gases) within field unit 10, and especially the contaminated refrigerant within storage containing unit 20, can be drawn through conduit 58, valve 62 and directly into the storage tank 56. Because of the way the fluid is routed in this system, it is not necessary to be concerned about recovered fluids contaminating the recovery system 40 and causing damage as may happen in other well-known units. While recovery is occurring, compressor 42 may continue to operate, if needed, in order to maintain the storage tank 56 at a desirable inside temperature. If the recovered contaminated refrigerant is in a gaseous state it will be partially, if not entirely, liquified because it will be cooled when transferred into the cooled storage tank 56. Because of this change in state, a greater amount of refrigerant can be stored in the storage tank 56. Also, because of the temperature and pressure differential between the storage containing unit 20 and storage tank 56, substantially all of the refrigerant stored in the storage containing unit 20 and in the remaining circuitry of the field unit 10 is transferred into the portable storage tank 56. Once transfer of the fluid is satisfactorily completed, valves 30 and 62 are closed and the compressor 42 is shut down if it has not yet already done so. If, for instance, the storage tank 56 becomes full prior to all of the contaminated refrigerant being removed from the field unit 10, the valves 30, 62 and 64 should be closed, the lines 58 and 60 should be disconnected, another portable storage tank 56 should be inserted within the evaporator housing 52, the lines 58 and 60 should be reconnected and the tank 56 can be cooled and evacuated by the method disclosed above. The valve 64 should then be closed and valves 30 and 62 should be opened and the remaining contaminated refrigerant may be recovered. At this time, the storage tank 56 should have a quantity of contaminated fluid within it that can later be recycled by a separate process. If the field technician desires to recover a different fluid, a separate storage tank 56 can be inserted within the evaporator housing 52 and the same process of recovering refrigerant as previously described can be conducted for this different fluid. If the same type of fluid is to be recovered, the same tank 56 can be used until it is full. It will be appreciated that depending upon the type of fluid being recovered, and the desired recovery rate, that the storage tank 56 can be cooled at various rates in order to obtain desirable effects.

Figure 3:
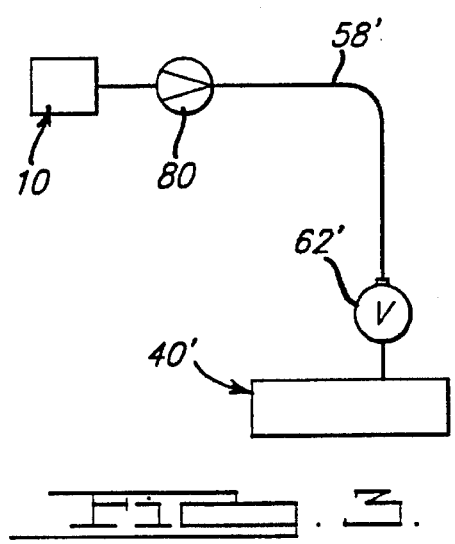
FIG. 3 is an alternative embodiment to the first preferred form of the invention where a booster pump is employed.

FIG. 3 illustrates an alternative refrigerant recovery system 40' whereby an optional booster pump 80 is located in line 58' just prior to flow control valve 62'. Other than this slight change, the remaining components of refrigerant recovery system 40' are the same as those components found in the previously discussed recovery system 40. The primary purpose of the booster pump 80 is for enhancing the recovery of refrigerant from the field unit 10. The booster pump 80 is of conventional design and shall be operable to pump a wide variety of fluids and can be manually activated or deactivated. Usage of the booster pump 80 allows vacuums in the range of 20 to 25 inches of Mercury to be obtained in the field unit 10, therefore, substantially all, if not all, of the fluid in the field unit 10 is recovered into storage tank 56.

The optional booster pump 80 may be activated at any time during the above-described recovery process to enhance the recovery of fluid from the field unit 10. It is preferred, however, that the pump 80 be activated later in the recovery process where primarily only gasses remain in the field unit 10. This will enhance the life of the pump 80 because contaminated liquids won't be present to contaminate the pump 80. The pump 80 may be activated and deactivated, manually or automatically, according to any desired operating condition.

Figure 4:
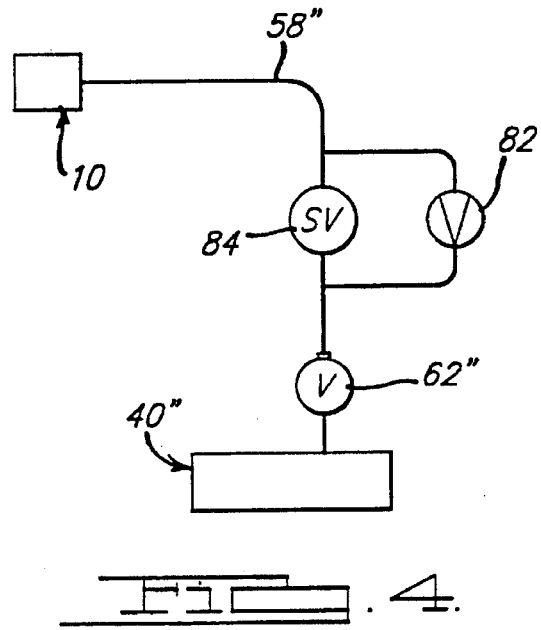
FIG. 4 is an alternative embodiment to the FIG. 3 invention where a booster pump and solenoid valve are employed.

An alternative to the FIG. 3 set up is illustrated in FIG. 4 where a booster pump 82 is provided and a solenoid valve 84 is located in-line with conduit 58" just before valve 62". The remaining components of the recovery system 40" are the same as those components found in the previously discussed recovery system 40.

During the initial recovery of fluids from the field unit 10, the booster pump 82 would be turned off and the solenoid valve 84 would be opened to allow free flow of fluids therethrough. At any time during the recovery process, the booster pump 82 may be turned on, however, it is preferred that it be employed only when nearly all of the fluid has been removed from the field unit 10. When this stage occurs, the solenoid valve 84 is closed and the booster pump 82 is activated to thereby enhance the removal of the remaining fluids in the field unit 10. This set up assures removal of all refrigerant from the field unit 10; at which time the pump 82 will be deactivated. The booster pumps 80 and 82 may be cycled on and off according to the desired effect.

Figure 5:
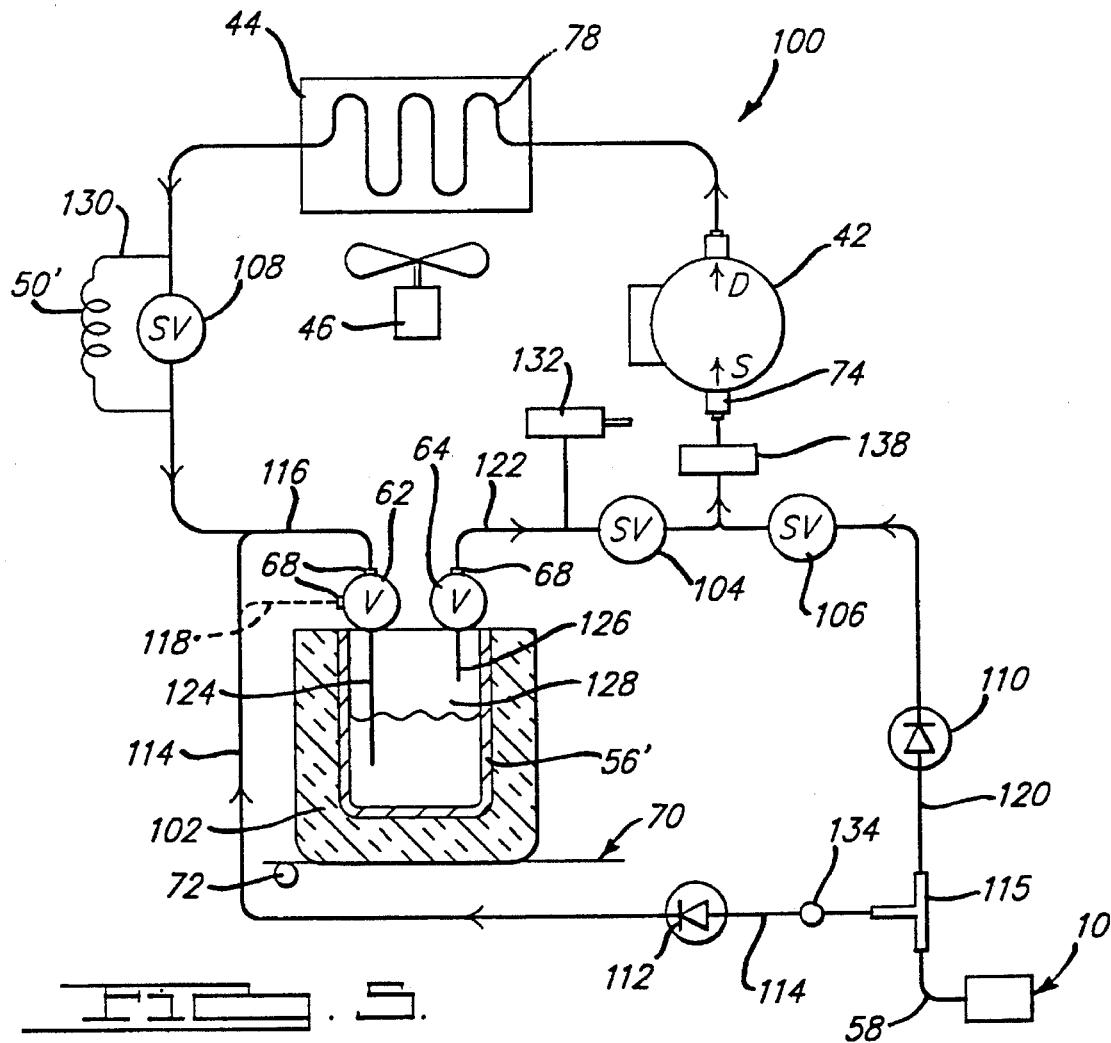
FIG. 5 is a schematic diagram of an alternative refrigerant recovery system showing the primary components of the system.

FIG. 5 illustrates an alternative refrigerant recovery system 100 that utilizes two separate phases of operation for recovering contaminated refrigerant from a field unit 10. The first phase is used primarily to remove the liquid refrigerant and some gases from the field unit 10 while the second phase is activated for only a short period of the recovery cycle whereby primarily contaminated gaseous fluids are recovered from the field unit 10. Where possible, like numbers are used to indicate elements previously discussed herein. The primary components of this novel refrigerant recovery system 100 includes a standard compressor 42, a standard condenser 44, a fan 46 for cooling the coils 78 of the condenser 44, a portable refrigerant recovery tank 56' that acts as a cold evaporator, a thermal insulation device 102 and a field unit 10 as previously described herein. The thermal insulation device 102 is provided for retaining and maintaining coolness of the recovery tank 56 and may be made of any thermal insulating type material such as styrofoam and may have an easily removable lid for encapsulating the recovery tank 56. Solenoid valves 104, 106, and 108 are provided in-line as well as check valves 110 and 112 for controlling the flow of refrigerant within the system 100. It will be appreciated that the solenoid valves could be replaced with manually operated valves, however, solenoid valves are preferred. Standard hand controlled fluid flow valves 62 and 64 are provided and may be connected to the recovery tank 56' for controlling the flow of fluid into and out of the tank 56'. Quick disconnect connectors 68 are provided on the valves for quick removal of the storage tank 56' from the system 100. The check valve 112 is located in conduit 114 that connects the field unit 10 via conduit 58 and Tee 115 to a return conduit 116. An alternative to this arrangement provides an alternative conduit 118 that connects to conduit 114 and dumps recovered fluids into valve 62 and into the bottom of recovery tank 56. The check valve 110 and solenoid valve 106 are located in a fluid conduit 120 that connects the field unit 10 via conduit 58 and Tee 115 to the compressor 42. The solenoid valve 104 is located in a fluid conduit 122 that connects with the valve 64 and the compressor 42. The remaining solenoid valve 108 is in return line 116 that is connected to valve 62 where a line 124 dumps refrigerant into the bottom of storage tank 56'. It is important to locate a suction conduit 126 within the tank 56' such that the end of conduit 126 is at a position above the liquid refrigerant within the storage tank so that only gases 128 are sucked out of the storage tank 56'. The conduits 124 and 126 may be attached to the storage tank 56' or the valves 62 and 64 in any conventional manner.

Other components of the recovery system 100 include an expansion device 50', preferably a capillary tube, which is provided in a circuit 130 that is routed around the solenoid valve 108. A conventional pressure switch 132 is in series with the return conduit 122 for sensing the pressure in the recovery tank 56'. This pressure switch 132 assists in the activation and deactivation of phases 1 and 2 which will be discussed later in greater detail. A sight glass 134 is in series with conduit 114 and allows the operator to view the flow of fluids through lines 114 during phase 1. And finally, a standard filter dryer 138 is preferably located at the suction side of the compressor 42 to remove contaminants such as acids from the recovered refrigerant. It will be appreciated that the filter dryer 138 could be located at other locations, for example, in line 114 before the sight glass 134 or in line 58. The delivery line or conduit 114 directs fluid during the phase 1 operation from the field unit 10 and into the return line 116. The second delivery line 120 directs fluid during the phase 2 operation from the field unit 10 to the compressor 42. The T-coupling 115 may have quick-disconnects 68 (not shown) and is used to join conduits 114 and 120 together to conduit/line 58. The conduit 58 may be a flexible ⅜ inch inside diameter hose, or the like. And finally, an optional transport structure 70 may be provided with wheels 72 in order to make the system 100 portable.

The operation of the refrigerant recovery system 100, as schematically illustrated in FIG. 5, will now be discussed. The first phase of operation may begin once the field unit 10 and recovery system 100 are properly connected. During the phase 1 operation, solenoid valves 106 and 108 are closed and solenoid valve 104 and hand valves 62 and 64 are opened. Once the compressor 42 is activated, reclaimed gas and liquid refrigerant (reclaimed fluid) is drawn from field unit 10 through conduit 58, check valve 112 and through line 114 where it is dumped into the return line 116 to combine with the cooled liquid refrigerant of system 100 before being passed through valve 62 and line 124 where it is then dumped into the bottom of recovery tank 56'. The refrigerant gas 128 is then sucked out of the refrigerant recovery tank 56' through the strategically located end of the conduit 126, through the hand valve 64, the line 122 to the solenoid valve 104 and through the filter dryer 138 and then back through the compressor 42 whereby the gas is condensed in the condenser 44, transmitted through the circuit 130 to the expansion device 50', through the conduit 116 where it is combined with reclaimed fluid from the conduit 114 and then dumped back into the recovery tank 56' via the conduit 124. The dumping of the reclaimed fluid into the conduit 116 tends to pre-cool the reclaimed fluid prior to being dumped into the tank 56'. If the alternative conduit 118 is employed, then the process above would be the same except that the reclaimed fluid would be directed specifically into the valve 62 and then into the conduit 124 and thus not be pre-cooled just prior to being dumped into the tank 56'. During phase 1, the operator will monitor sight glass 134 to determine when all of the liquid refrigerant is removed from the field unit 10. The clearing of the sight glass 134 indicates that all of the easily removable liquid refrigerant has been completely removed from field unit 10; at which time the operator will flip a manual switch (not shown) to an automatic phase. During this automatic phase the pressure switch 132 continues to sense the fluid pressure within conduit 122 and will preferably activate phase 2 once the pressure within the recover tank 56' reaches 40 PSIG. If the pressure within recovery tank 56' is 40 PSIG or less once the manual switch is flipped to the automatic phase, then the pressure switch 132 will automatically activate the phase 2 operation. This portion of phase 1 can be automated through the use of a liquid sensor 136 that automatically senses the presence of liquid refrigerant in line 114. The discussion of sensor 136 is set out in greater detail in the discussion of the FIG. 6 embodiment. It will be appreciated that the pressure switch 132 can be set to activate phase 1 at other pressure levels, however, 40 PSIG is presently preferred.

The life of the compressor 42 is enhanced because of cooled refrigerant gas being passed through it during phase 1 and also because no liquid refrigerant is passed through it during the phase 1 operation. As an efficiency and safety measure, refrigerant is prevented from returning to the field unit 10 by the positioning the of check valves 110 and 112. Under normal operating conditions, phase 1 is expected to take approximately four minutes to complete whereby approximately eleven pounds of R-502 refrigerant is recovered which should be all of the liquid refrigerant in the field unit 10. It will be appreciated that the rate of recovery and other performance characteristics will vary depending upon the type of refrigerant being recovered, the size of the field unit 10, and other factors.

The system 100 is designed such that little or no refrigerant needs to be in the storage tank 56' when phase 1 is activated in order for the reclaiming process to work. However, the process of reclaiming fluids from the field unit 10 would be enhanced if at least a small amount of refrigerant is present in the storage tank 56' by which the cooling process may be initiated because the system 100 has no significant volumes of refrigerant available other than that located in the lines and the various components of the system 100. It should be noted that as the refrigerant available to compressor 42 increases due to the addition of the recovered refrigerant, the cooling capacity of the system will also increase thus creating a snowballing effect promoting the recovery process.

During phase 2 of the refrigerant recovery process, the solenoid valve 104 is closed and the solenoid valves 106 and 108 are opened. The hand valves 62 and 64 remain open during this phase also. The compressor 42 will remain in operation during the phase 2 operation. Once phase 2 is activated, reclaimed fluid, primarily in gaseous form, is sucked out of field unit 10, passed through the conduit 120, the check valve 110, the solenoid valve 106 and through the dryer 138 to the suction side 74 of the compressor 42 whereby the fluid then passes through the valve 108 and into the storage tank 56' via conduit 116. Phase 2 operates faster than phase 1 and may take approximately two minutes to reach a vacuum of 20 inches of Mercury, or less, within the field unit 10 which results in substantially all of the refrigerant being recovered from the field unit 10. Together, phases 1 and 2 take approximately eight minutes to perform whereby approximately twelve and one-half pounds of R-502 refrigerant may be reclaimed. This offers a substantial improvement in fluid recovery performance over other well-known systems.

Temperature sensors, not shown, may be provided in the system 100 to assure that the compressor 42 does not overheat during the phase 1 and/or phase 2 operations. The refrigerant recovery system 100 may also be made operable to modulate between phases 1 and phases 2 in order to satisfy any desirable operations. For example, to prevent the storage tank 56' or the compressor 42 from overheating, it would be desirable to cool them down and this can be done by reactivating phase 1 for a certain period of time.

And finally, it is possible that a service technician could hook up conduit 58 directly to either a gas outlet port or a liquid outlet port (not shown) that may be provided on the field unit 10. This would allow gases or liquids to be recovered individually from the field unit 10 to a storage tank that is set up for either gases or liquids.

FIG. 6 illustrates an alternative embodiment 200 to the FIG. 5 refrigerant recovery system 100. The refrigerant recovery system 200 includes essentially the same components of the FIG. 5 embodiment and, where applicable, the same reference numerals are used. The primary modification to this embodiment includes the change in the fluid and electrical circuitry whereby an automatic liquid sensor 136 is located in line 114 to sense the presence, and/or lack thereof, of liquid refrigerant that is being recovered from field unit 10. The usage of this liquid sensor 136 allows the refrigerant recovery system 200 to be entirely automated which minimizes the possibility for operator errors and maximizes fluid recovery. The fluid sensor 136 replaces the sight glass 134 which previously required an operator to flip a manual electronic switch which then allowed pressure switch 132 to sense the pressure of the fluid in tank 56' and to activate the phase 2 once approximately 40 PSIG was attained within storage tank 56'. Here, the liquid sensor 136 automatically senses the lack of fluid in line 114 and produces a signal that allows pressure switch 132 to activate phase 1 once the predetermined pressure is attained within storage tank 56'. Usage of this sensor 136 allows the field technician to perform other services while the refrigerant is automatically being recovered from the field unit 10, as well as eliminates any judgment call by the operator as to whether all of the liquid refrigerant has been recovered from the field unit 10. This of course increases the efficiency of the refrigerant recovery system 200.

A further modification to the FIG. 6 embodiment is illustrated by the locating of the pressure switch 132 in line 116. However, it will be appreciated that the pressure switch can be located at various places throughout the recovery system 200 and, is preferably located in conduit 122.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

I claim:

1. A refrigerant recovery system for recovering contaminated refrigerant from a refrigeration system, said refrigerant recovery system comprising:

storage means for receiving said contaminated refrigerant;

means for cooling the storage means, said means for cooling including an evaporator tank comprising heat exchange coils which substantially surround said storage means;

means for reducing the pressure within the storage means to a predetermined level, said means for reducing pressure including a vacuum pump positioned such that it is not in a direct flow path as defined between said refrigeration system and said storage means; and valving means for selectively evacuating said storage means either alone or in combination with said direct flow path; whereby the refrigerant recovery system is operable to receive and contain the recovered refrigerant within said storage means and is further operable to prevent said pump from being directly contaminated by said recovered refrigerant.

2. The system according to claim 1, wherein the means for cooling further includes:

condenser means for condensing refrigerant within the refrigerant recovery system.

3. The system according to claim 1, wherein the means for cooling includes heat exchange coils substantially surrounding said storage means, said means for cooling is operable to receive and cool the storage means to a predetermined low temperature.

4. The system according to claim 1, wherein the means for cooling is operable to cool the storage means to an inside temperature of zero degrees Fahrenheit.

5. The system according to claim 1, wherein the storage means is a pressure vessel portable and insertable within the means for cooling, said storage means further includes valve means for controlling the flow of refrigerant into said storage means.

6. The system according to claim 1, wherein said cooling means includes compressor means for compressing refrigerant contained in a closed-loop system, said compressor being isolated from direct contact with said contaminated refrigerant.

7. A portable closed-looped fluid recovery system for recovering fluid from an independent system, said closed-looped fluid recovery system having a compressor and further comprising:

a transportable storage structure for receiving recovered fluid from the independent system;

a first flowpath extending between the independent system and the storage structure;

means for cooling the storage to a predetermined temperature, said means for cooling comprising an evaporator housing that is connected to a closed-loop refrigeration circuit, said housing having evaporator coils that are operable to receive and surround said transportable storage structure;

a second flowpath connecting the storage structure and a means for reducing pressure, said second flow path defining a means to evacuate said storage structure independent of evacuating said first flow path; and means for reducing the pressure within the storage structure to a predetermined level, said means for reducing pressure being connected directly to said storage structure and being independent of said means for cooling said storage structure, said means for reducing pressure being connected to a flow path other than said first flow path extending between said independent system and said storage structure;

whereby said closed-looped fluid recovery system is operable to receive and contain the recovered fluid within the storage structure while the recovered fluid avoids contact with said compressor and said means for reducing pressure.

8. The system according to claim 7, wherein the means for cooling the storage structure is an evaporator having heat exchange means surrounding said storage structure, said evaporator being operable to receive and cool the storage structure.

9. The system according to claim 7, wherein the means for reducing pressure is a vacuum pump, said vacuum pump being connected to said storage structure and being operable to reduce the pressure therein.

10. The system according to claim 7, wherein the storage structure is a removable storage tank capable of retaining recovered fluid and capable of being inserted within the means for cooling.

11. The system according to claim 7, further comprising a booster pump positioned to enhance the removal of fluid from the independent system.

12. A closed refrigerant recovery system for recovering refrigerant from a refrigeration unit, said closed refrigerant recovery system comprising:

a storage structure capable of being evacuated and receiving recovered refrigerant from the refrigeration unit;

a cooling device operable to receive the storage structure, and the cooling device further being operable to maintain the storage structure at a predetermined temperature while refrigerant is being recovered;

a condensing device for condensing refrigerant in the closed refrigerant recovery system;

a vacuum pump connected to the storage structure such that the vacuum pump is not in a direct flow path that extends between said refrigeration unit and said storage structure, the pump being operable to reduce the pressure within the storage structure;

an evaporator housing containing said cooling device and said storage structure and connected to said vacuum pump such that said recovered refrigerant does not contact said evaporator or said cooling device;

flow control means operable to control the flow of refrigerant into the storage structure, said flow control means comprising a first valve positioned between said storage structure and said vacuum pump and further comprising a second valve positioned in a line between said refrigeration unit and said storage structure, said first and second valves operable to selectively draw a vacuum on said storage structure and said line; and a compressor located between the cooling device and condensing device;

whereby the closed refrigerant recovery system is configured to isolate the recovered refrigerant from the compressor and the vacuum pump.

13. The closed refrigerant recovery system according to claim 12, further comprising a portable transporting structure capable of transporting the closed refrigerant recovery system.

* * * * *